DRIVER CIRCUIT FOR MAGNETIC CORE DEVICE

Filed June 29, 1964 3 Sheets-Sheet 1

INVENTORS
KEITH HENRY DORMER
CHARLES THOMAS WYRICK
BY Curtis, Morris & Safford

DRIVER CIRCUIT FOR MAGNETIC CORE DEVICE

Filed June 29, 1964

3 Sheets-Sheet 2

INVENTORS
KEITH HENRY DORMER
CHARLES THOMAS WYRICK
BY Curtis, Morris & Safford

INVENTORS
KEITH HENRY DORMER
CHARLES THOMAS WYRICK
BY Curtis, Morris & Safford 3,284,644
Patented Nov. 8, 1966

3,284,644

DRIVER CIRCUIT FOR MAGNETIC CORE DEVICE

Keith Henry Dormer, Harrisburg, and Charles Thomas Wyrick, Camp Hill, Pa., assignors to AMP Incorporated, Harrisburg, Pa.

Filed June 29, 1964, Ser. No. 378,652
15 Claims. (Cl. 307—88.5)

This invention relates to an improved driver circuit for magnetic core shift registers and the like.

An object of this invention is to provide an improved drive circuit for operating magnetic core devices, such as, shift registers, at high speeds.

Another object is to provide such a drive circuit which is very reliable, which is easy to control, and which is relatively simple and inexpensive.

A further object of the present invention is to provide a drive circuit which properly sequences the alternate operation of pulsing networks as well as providing a control current.

A more specific object is to provide a drive circuit for energizing at high speed a magnetic core shift register using multiaperture cores.

In a multiaperture (MAD) core shift register, such as shown in U.S. Patent No. 2,995,731, transfer of information from one core in the register to the next is accomplished by driving the one core with a properly shaped "advance" current which returns the core to "clear" condition and simultaneously causes the transfer of the information stored in this core to the next core. Thereafter, the latter core is "cleared" by a second advance current, and so on. Between the advance currents applied to the cores, there is also applied a "prime" current which, so to speak, conditions each given core in the register so that thereafter upon the occurrence of an advance current, information can be transferred to the next core. The construction and operation of such a shift register is explained in detail in the aforesaid patent.

Now, one of the problems with a shift register of this kind is how to apply to the various cores currents of proper amplitude, shape and sequence to effect the required shifting operation. This problem becomes particularly difficult at very high speeds of operation. The present invention provides an improved supply unit particularly suitable for a magnetic core device of this kind. This new driver unit can be operated at high speed, yet it uses only solid state devices (i.e., no vacuum tubes), and it is extremely reliable in operation over a large temperature range.

Heretofore, four-layer diodes have been employed to controllably switch the charging and discharging of a single capacitor through a pulse-forming network to form distinct output pulses. The circuit of this prior approach has proven highly successful in that it is less expensive and more reliable than prior known circuits of the same capability. However, one drawback of this circuit arrangement has been that an external prime source was necessary to operate the priming circuit of the shift register which adds to the overall circuit arrangement of the shift register as well as increasing the cost thereof and the requirement that the external prime source be on at all times if the external prime source is D.C. If the external prime source is other than D.C., then additional sequencing circuitry would be necessary which would create additional cost as well as the problem of maintaining proper sequencing operation.

In accordance with the present invention in one specific embodiment thereof, a single capacitor is arranged to be charged from a source of supply. Thereafter, the charge which has accumulated in the capacitor is discharged on command through a four-layer diode switch through an advance winding of the shift register, and after being recharged is then discharged on command through another similar four-layer diode switch through another advance winding of the shift register to provide proper sequencing to the advance circuits. The cores of the register between the advance currents are supplied with a pulse of prime current which is derived during the charging of the capacitor and which does not interfere with the advance currents. This cycle of charging and discharging of the capacitor to provide the prime and advance currents can be carried out at high speed, and since the second advance current is not dependent upon the first advance current, a high degree of proper sequence and fail-safe operation is achieved. Moreover, the parts required for this new driver are relatively few and inexpensive.

Other objects and attainments of the present invention will become apparent to those skilled in the art upon a reading of the following detailed description when taken in conjuction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

Figure 1:
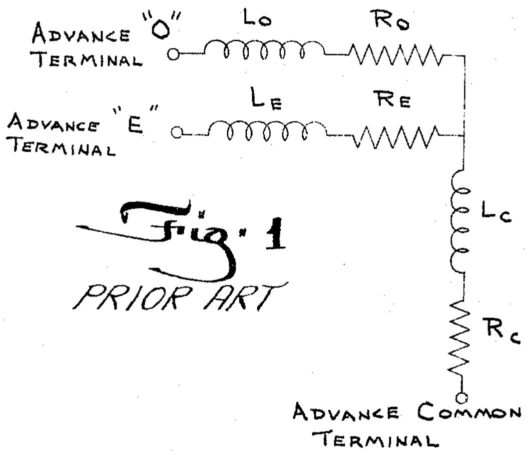
FIGURE 1 is a schematic representation of the drive requirement for a MAD shift register.

From a drive require standpoint, a MAD core arrangement is represented schematically as shown in FIGURE 1 and comprises windings $L_O$ and $L_E$ connected in series with respective resistances $R_O$ and $R_E$ which, in turn, are serially connected to a common inductance $L_c$ and resistance $R_c$ in series relationship.

Figure 2:
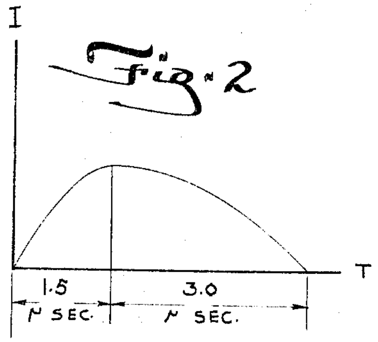
FIGURE 2 is a graphic representation of a wave shape for the embodiment of FIGURE 1.

Proper operation requires that current pulses be successively applied through the ADVANCE "O" to ADVANCE COMMON and ADVANCE "E" to ADVANCE COMMON terminals. It has been determined that the wave shape of these two current pulses should each be as illustrated in FIGURE 2. The required peak current amplitude varies from one MAD core arrangement to another depending on the core size and method of wiring, but normally will be between 1.5 and 5.0 amperes with a time of 1.5 microseconds from zero current to peak current and a time of 3 microseconds from peak current to zero current.

Figure 3:
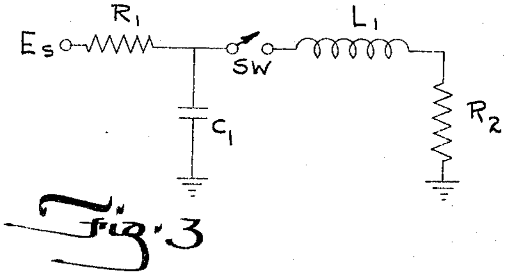
FIGURE 3 is a schematic representation similar to FIGURE 1 showing the drive circuit to one advance winding of a shift register.

Current pulses of the required wave shape and amplitude may be generated by discharging a capacitor through a series connected inductance and resistance as shown in FIGURE 3. Capacitor $C_1$ charges through resistor $R_1$ to a voltage equal to the supply voltage $E_s$. When switch SW is closed, capacitor $C_1$ discharges through inductor $L_1$ and resistor $R_2$. The discharge current pulse may be made to have the desired wave shape and amplitude by proper selection of $C_1$, $L_1$, and $R_2$. When switch SW is opened, capacitor $C_1$ recharges through resistor $R_1$.

Figures 4, 6:
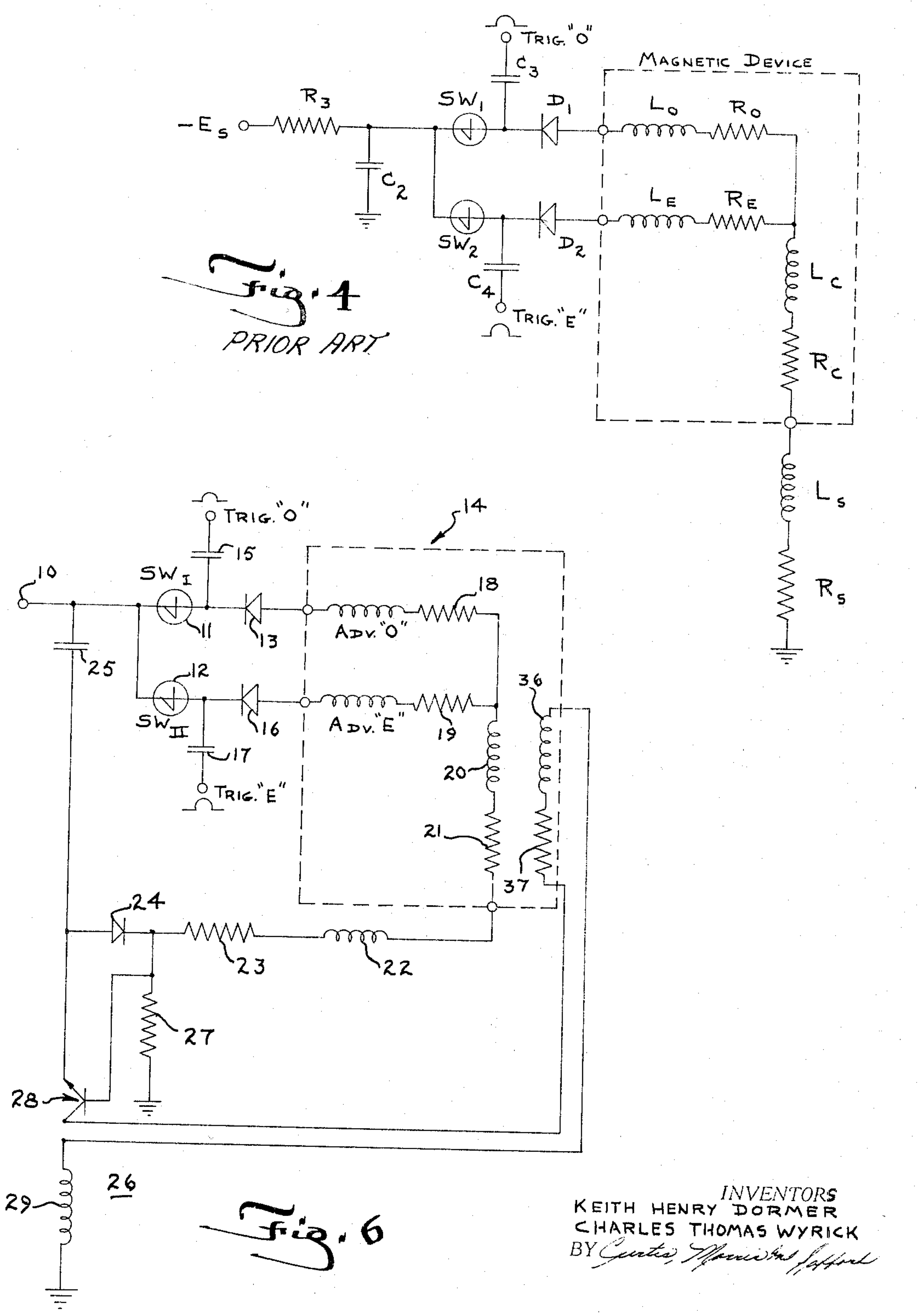
FIGURE 4 is a schematic circuit diagram of a conventional drive circuit for the advance windings of a shift register.
FIGURE 6 is a schematic diagram of the circuit of the invention.

A practical and conventional circuit for generating the required pulses by this method is shown in FIGURE 4. If this circuit is connected to a voltage source, $-E_s$, capacitor $C_2$ will charge to a voltage equal to $-E_s$ through resistor $R_3$. Application of a positive voltage pulse to the TRIG. O terminal will turn the four-layer diode $SW_1$ on through capacitor $C_3$. Capacitor $C_2$ now discharges through $SW_1$, $D_1$, $L_o$, $R_o$, $L_c$, $R_c$, $L_s$ and $R_s$. The purpose of diode $D_1$ is to prevent the positive trigger pulse from being shorted to ground through $L_o$, $R_o$, $L_c$, $R_c$, $L_s$ and $R_s$. Because the discharge circuit contains inductance, capacitor $C_2$ will charge to a small voltage opposite in polarity to $-E_s$. This voltage will back-bias the four-layer diode $SW_1$, and, if maintained (5 to 10 microseconds) will allow $SW_1$ to return to its off or nonconducting state. Capacitor $C_2$ will then recharge through resistor $R_3$.

Application of a positive voltage pulse to the TRIG. E terminal through capacitor $C_4$ will discharge capacitor $C_2$ through $SW_2$, $D_2$, $L_E$, $R_E$, $L_c$, $R_c$, $L_s$ and $R_s$ as above. Values of $-E_s$, $C_2$, $L_s$ and $R_s$ may be selected to generate the required current wave shape and amplitude. A more complete explanation of four-layer diodes as solid state switches can be found in Serial No. 156,616, filed December 4, 1961, now U.S. Patent No. 3,154,694 and assigned to the present assignee.

Figure 5:
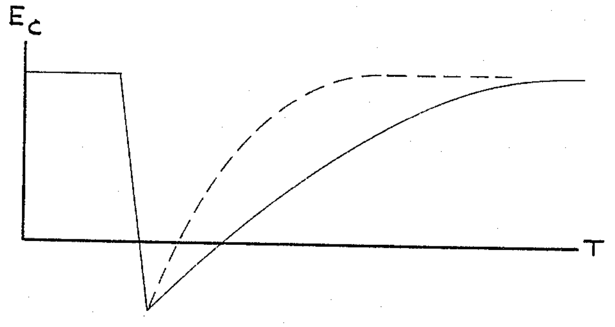
FIGURE 5 is a voltage time curve of the charging capacitor used in the circuit of FIGURE 4.

The circuit of FIGURE 4 has been used successfully in numerous applications over an extended period. However, it does suffer several limitations. One of the most serious is that the maximum speed of operation is limited to about 1000 cycles per second. Operation speed is determined by the product $R_3C_2$, the speed being inversely proportional to this product. As explained above, capacitor $C_2$ must be maintained in a reverse charge condition long enough for the "on" four-layer diode, $SW_1$ or $SW_2$, to recover to its off condition. As shown in FIGURE 5, the nonbroken line illustrates the rate of discharge and recharge of capacitor $C_2$ with resistor $R_3$ at a high value which does not provide that capacitor $C_2$ remain in a state of reverse charge long enough to allow $SW_1$ or $SW_2$ to recover. Even if $R_3$ is made too low in value, as indicated by the broken line, capacitor $C_2$ will not remain in a reverse charge state long enough to allow $SW_1$ or $SW_2$, to recover. The result is that the on four-layer diode, $SW_1$ or $SW_2$, remains on and capacitor $C_2$ cannot properly recharge. This factor determines the minimum value of $R_3$ and, thus, the maximum operating frequency.

Turning now to FIGURE 6, there is shown the circuit arrangement of the present invention which is similar to that disclosed in Serial No. 331,999, filed December 20, 1963, and assigned to the present assignee. A suitable source of voltage is denoted at 10 which is connected to four-layer diodes 11 and 12 acting as solid state switches $SW_I$ and $SW_{II}$, respectively. Four-layer diode 11 is serially connected to diode 13 and an ADV. O winding of shift register 14. A positive TRIG. O voltage pulse from a conventional trigger circuit (not shown) is applied between four-layer diode 11 and diode 13 through a capacitor 15.

Four-layer diode 12 is also serially connected to diode 16 and an ADV. E winding of shift register 14. A positive TRIG. E voltage pulse from the trigger circuit is applied between four-layer diode 12 and diode 16, through a capacitor 17.

Each ADV. O and ADV. E winding is serially connected to a respective resistor 18, 19, and these, in turn, are connected in series with inductance 20, resistor 21, inductance 22, resistor 23, diode 24 and capacitor 25. The other end of capacitor 25 is connected between voltage source 10 and four-layer diodes 11, 12.

A control circuit 26 is connected in shunt with diode 24 for controlling the recharging rate of capacitor 25.

Control circuit 26 includes a resistor 27 connected between ground and the cathode of diode 24. The emitter of a transistor 28 is connected to the anode of diode 24 while the collector thereof is connected through prime winding 36, series resistor 37 and inductor 29 to ground. The base of transistor 28 is connected between the cathode of diode 24 and resistor 27.

Operation of the circuit of FIGURE 6 is as follows: When the circuit is connected to source of voltage 10, capacitor 25 charges through transistor 28 and inductor 29. The base current of transistor 28 is supplied through resistor 27. Application of a positive voltage pulse to the TRIG. O terminal will turn four-layer diode 11, which is switch $SW_I$, on. Capacitor 25 will then discharge through $SW_I$, diode 13, ADV. O winding, resistor 18, inductance 20, resistor 21, inductance 22, resistor 23 and diode 24. This in indicated at 30 in FIGURE 7.

Discharge current from capacitor 25 produces a voltage drop across diode 24 which back-biases transistor 28 and turns it to an off or nonconducting condition. As stated in conjunction with FIGURES 4 and 5, capacitor 25 will charge in a reverse manner to provide a small reverse voltage as indicated at 31 in FIGURE 7, thus, back-biasing $SW_I$.

Figure 7:
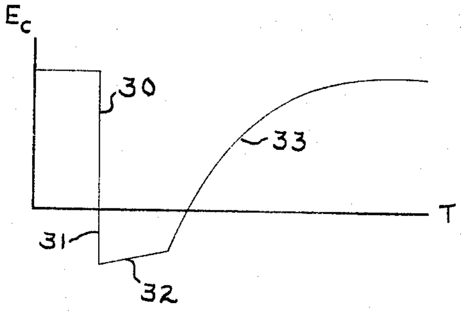
FIGURE 7 is a voltage time curve of the charging capacitor used in the circuit of FIGURE 6.

Due to the fact that transistor 28 is in a non-conducting condition, capacitor 25 starts to recharge through resistor 27 and diode 24 as indicated at 32 in FIGURE 7. This will continue until diode 24 can recover to its off condition.

Figure 9:
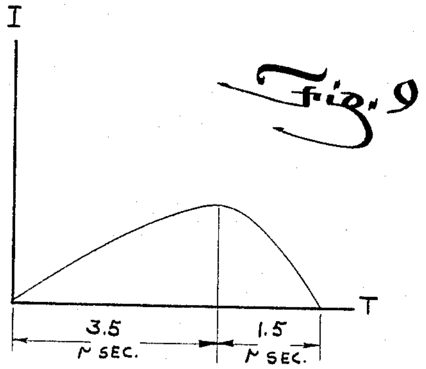
FIGURE 9 is a current time curve of the charging capacitor used in the circuit of FIGURE 6.

Diode 24 is selected to have a long recovery time and resistor 27 has a large ohmic value which is large enough to prevent continuous conduction of four-layer diode 11. As soon as diode 24 recovers, i.e., turns off, back-bias is no longer applied to transistor 28 which now turns on to its conduction state and capacitor 25 now recharges through transistor 28, inductor 29, prime winding 36 and resistor 37, as indicated at 33 in FIGURE 7, with current through prime winding 36 as shown in FIGURE 9. The current rises in an L–C mode until the capacitor 25 charges to slightly higher than $E_c$, back-biasing transistor 28, thereby causing rapid turn-off. The fast recharge of capacitor 25 is allowable since transistor 28 has been held off long enough to permit $SW_I$ to recover to its nonconduction state. The same operation, as outlined above, occurs when a positive voltage pulse is applied to terminal TRIG. E to operate $SW_{II}$. The current pulse of FIGURE 9 may be varied in peak amplitude and duration by proper selection of inductor 29 and capacitor 25.

As has been discerned, there has been described a novel circuit arrangement to provide a high degree of proper sequence and fail-safe operation to a load device, such as, for example, a shift register.

Figure 8:
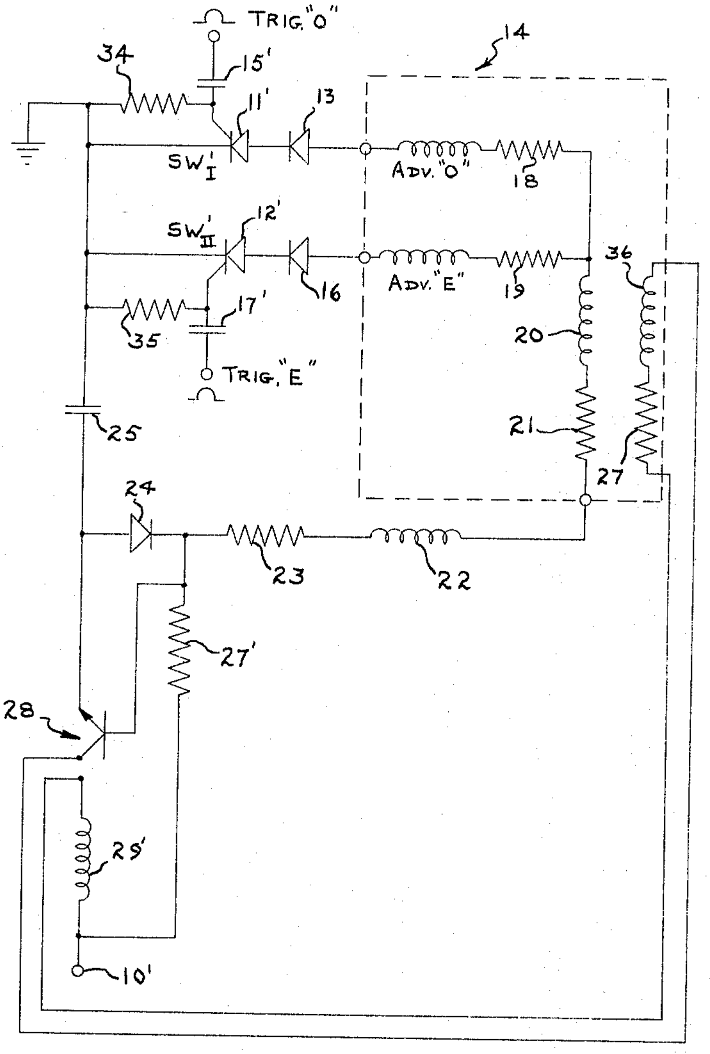
FIGURE 8 is an alternative embodiment of the circuit of FIGURE 6.

While the present invention has been described in conjunction with four-layer diodes, it is to be understood that other solid state switching semi-conductors, such as, for example, of the silicon-controlled rectifier type, can be used in place of the four-layer diodes. Such an arrangement is illustrated in FIGURE 8 wherein the four-layer diodes are replaced by SCR's 11' and 12' and are accordingly switches $SW'_I$ and $SW'_{II}$, respectively. The cathodes of SCR's 11' and 12' are connected to ground while the gates thereof are connected to ground through resistors 34 and 35, respectively. A positive TRIG. O and TRIG. E voltage pulse is connected to the gates of SCR's 11' and 12' through capacitors 15' and 17', respectively. Voltage source 10' is connected to resistor 27' and inductor 29'. Otherwise, the rest of the circuit of FIGURE 8 is similar to that of FIGURE 6 and need not be further explained.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. An electronic circuit comprising solid state switch means connected to be driven to conduction, to operate load means an input for applying a constant voltage to said switch means, means in circuit with said switch means and responsive to conduction thereof to produce output pulses, to said load means and means connected to said last-mentioned means to delay recharging thereof to provide control current to a further load means and to provide proper sequential conduction of said switch means.

2. An electronic circuit according to claim 1 wherein said output pulse producing means includes a capacitor.

3. An electronic circuit according to claim 1 wherein said switch means are four-layer diodes.

4. An electronic circuit according to claim 1 wherein said switch means are silicon-controlled rectifiers.

5. An electronic circuit according to claim 1 wherein said delay means includes a transistor means and impedance means connected to a back-biasing means.

6. An electronic circuit according to claim 5 wherein said impedance means includes a relatively high resistance to provide back-biasing through said back-biasing means to said transistor means until recovery thereof and an inductance means to provide recovery of said switch means.

7. A pulse generator comprising a first and second solid state switching means, a source of constant voltage connected to said switching means, triggering pulse source means connected to each switching means, a capacitor connected to be discharged by the conduction of each switching means, pulse-forming network means including said capacitor connected to output terminal means, the charging and discharging of said capacitor producing output pulses at said output terminal means, and means connected to said pulse-forming network means to delay recharging of said capacitor, to provide control current to further output terminal means and to provide proper sequential conduction of said switch means.

8. A pulse generator according to claim 7 wherein said solid state switching means comprises four-layer diode means.

9. A pulse generator according to claim 7 wherein said solid state switching means comprises silicon-controlled rectifier means.

10. A pulse generator according to claim 7 wherein said delay means includes transistor means connected to said capacitor including impedance means and back-biasing means to provide conduction and nonconduction of said transistor means.

11. A power supply adapted to energize with short current pulses alternate ones of inductive windings of a magnetic core shift register and the like comprising a constant voltage source, a first switch means adapted to be triggered on by a voltage, first means including a blocking diode and a capacitor for connecting said first switch means to one of the inductive windings in a pulse-forming circuit, a second switch means adapted to be triggered on by a voltage, second means including another blocking diode and said capacitor for connecting said second switch means to another of said inductive windings in another pulse-forming circuit, and means in said pulse-forming circuits for delaying recharging of said capacitor for conduction of said switch means, to provide proper sequential operation thereof and to provide control current to a further of said inductive windings.

12. A power supply according to claim 11 wherein said switch means are four-layer diodes.

13. A power supply according to claim 11 wherein said switch means are silicon-controlled rectifiers.

14. A power supply according to claim 11 wherein said delay means includes a first circuit means providing high impedance to prevent any recharging of said capacitor for a period of time and a second circuit means providing low impedance to recharge said capacitor.

15. A power supply according to claim 12 wherein said first circuit means includes a semi-conductor means, resistance means and back-biasing means connected to said semi-conductor means, said second circuit means includes said semi-conductor means and inductance means connected thereto.

References Cited by the Examiner

UNITED STATES PATENTS

| | | | |
|---|---|---|---|
| 3,053,999 | 9/1962 | Baudin | 307—88.5 |
| 3,103,647 | 9/1963 | Dorros. | |
| 3,151,251 | 9/1964 | Lee | 307—88.5 |
| 3,154,693 | 10/1964 | Wiley | 307—88.5 |
| 3,154,694 | 10/1964 | Wiley | 307—88.5 |
| 3,165,645 | 1/1965 | Campbell | 307—88.5 |
| 3,184,665 | 5/1965 | Wright. | |
| 3,191,060 | 6/1965 | Mahoney | 307—88.5 |

ARTHUR GAUSS, *Primary Examiner.*

I. C. EDELL, R. H. EPSTEIN, *Assistant Examiners.*